United States Patent
Suzaki et al.

(10) Patent No.: US 11,526,137 B2
(45) Date of Patent: Dec. 13, 2022

(54) OPERATION VERIFICATION PROGRAM, OPERATION SYNCHRONIZATION METHOD, AND ERROR DETECTION APPARATUS

(71) Applicant: RENESAS ELECTRONICS CORPORATION, Tokyo (JP)

(72) Inventors: Shinichi Suzaki, Tokyo (JP); Toshihiro Kawano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 415 days.

(21) Appl. No.: 16/732,036

(22) Filed: Dec. 31, 2019

(65) Prior Publication Data

US 2020/0218206 A1 Jul. 9, 2020

(30) Foreign Application Priority Data

Jan. 9, 2019 (JP) .............................. JP2019-001616

(51) Int. Cl.
*G05B 9/02* (2006.01)
*G06F 3/06* (2006.01)
*G06F 11/07* (2006.01)

(52) U.S. Cl.
CPC ............. *G05B 9/02* (2013.01); *G06F 3/0616* (2013.01); *G06F 3/0653* (2013.01); *G06F 3/0659* (2013.01); *G06F 3/0679* (2013.01); *G06F 11/0727* (2013.01); *G06F 11/0757* (2013.01); *G06F 11/0772* (2013.01)

(58) Field of Classification Search
None
See application file for complete search history.

(56) References Cited

U.S. PATENT DOCUMENTS

| 5,390,103 A | * | 2/1995 | Sakakibara | ........ G05B 19/0421 |
| | | | | 713/375 |
| 7,370,229 B2 | * | 5/2008 | Ohno | .................... G06F 3/0605 |
| | | | | 714/6.1 |
| 10,049,029 B1 | * | 8/2018 | Vu | ...................... G06F 11/3656 |

(Continued)

FOREIGN PATENT DOCUMENTS

| JP | 2005-107909 A | 4/2005 | |
| WO | WO-2006080432 A1 | * 8/2006 | ............... G06F 1/12 |

*Primary Examiner* — Philip Wang
*Assistant Examiner* — Rongfa P Wang
(74) *Attorney, Agent, or Firm* — McDermott Will & Emery LLP

(57) ABSTRACT

In the conventional semiconductor device, it is impossible for two CPUs to operate memories to be debugged at synchronous timings. According to one embodiment, the operation verifying program analyzes the operation verifying command received by the first semiconductor device 10 from the external device 31 by its own device (S32), transfers the operation verifying command to the second semiconductor device 20 (S31, S41), also analyzes the operation verifying command in the second semiconductor device 20 (S42), outputs the trigger signal (S34, S44) to the first semiconductor device 10 from the second semiconductor device 20 based on the result of the analysis, writes the memory setting values included in the operation verifying command to the memories in the respective semiconductor device (S35, S45) based on the trigger signal, and restarts the device operation based on the written memory setting values.

19 Claims, 7 Drawing Sheets

(56) References Cited

U.S. PATENT DOCUMENTS

| | | | |
|---|---|---|---|
| 2002/0124202 A1* | 9/2002 | Doody | G06F 11/1691 |
| | | | 714/5.1 |
| 2007/0168651 A1* | 7/2007 | John | G06F 11/2236 |
| | | | 714/E11.166 |
| 2018/0253368 A1* | 9/2018 | Villarreal | G06F 11/3628 |
| 2018/0336133 A1* | 11/2018 | Turner | G06F 12/1072 |
| 2018/0365130 A1* | 12/2018 | Hintsala | G06F 11/3664 |
| 2022/0034969 A1* | 2/2022 | Usagawa | G01R 23/04 |

* cited by examiner

OPERATION VERIFICATION PROGRAM, OPERATION SYNCHRONIZATION METHOD, AND ERROR DETECTION APPARATUS

CROSS-REFERENCE TO RELATED APPLICATIONS

The disclosure of Japanese Patent Application No. 2019-001616 filed on Jan. 9, 2019 including the specification, drawings and abstract is incorporated herein by reference in its entirety.

BACKGROUND

The present invention relates to an operation verifying program, an operation synchronization method, and an abnormality detection device, and, for example, the present invention relates to an operation verifying program, an operation synchronization method, and an abnormality detection device, which are capable of debugging a program installed on a semiconductor device by an external debugging device.

In an MCU (Micro Controller Unit) having an arithmetic unit capable of executing a program, debugging is performed while a program installed on the MCU is operated in a software development stage. Among arts related to debugging, a debugging technique in a system in which two CPUs (Central Processing Unit) are operated in cooperation with each other is disclosed in Japanese Unexamined Patent Application Publication 2005-107909.

The technique described in Japanese Unexamined Patent Application Publication 2005-107909 relates to a multiprocessor system. Then, the multiprocessor system disclosed in Japanese Unexamined Patent Application Publication 2005-107909 is a multiprocessor system having a debugging function for debugging a program operating on a CPU, in a multiprocessor system communicably coupling a plurality of CPU units each of which has a CPU executing a program and a memory storing a program, the multiprocessor system includes a first CPU unit having a connection means for communicating with an external device, and one or more second CPU units having no the connection means, wherein the first CPU unit has a command receiving means for receiving a command transmitted from an external device, a command transferring means for transferring the content of the received command to the second CPU unit, wherein the second CPU unit receives a transfer command receiving means for receiving the content of the command transferred by the command transferring means, and an execution means for executing a debugging function in accordance with the content of a command received by the transfer command receiving means.

SUMMARY

However, in the art described in Japanese Unexamined Patent Application Publication 2005-107909, debugging can be performed only for one of the two CPUs, and there is a problem that the memory to be debugged cannot be operated for the two CPUs at synchronized timing.

Other objects and novel features will become apparent from the description of this specification and the accompanying drawings.

According to one embodiment, the operation verifying program is a program installed on the first semiconductor device and the second semiconductor device communicably coupled, wherein the first semiconductor device analyzes the operation verifying command received from the external device by its own device, transfers it to the second semiconductor device, also analyzes the operation verifying command in the second semiconductor device, outputs the trigger signal from the second semiconductor device to the first semiconductor device based on the result of the analysis, writes the memory setting value included in the operation verifying command to the memory in the respective semiconductor device at a time when the first semiconductor device and the second semiconductor device synchronize with each other based on the trigger signal, and restarts the operation of the device based on the written memory setting value.

According to the above-mentioned embodiment, in the two semiconductor devices coupled so as to be able to communicate with each other, the operation based on the operation verifying commands supplied from the outside can be executed at synchronized times.

DETAILED DESCRIPTION

Figure 1:
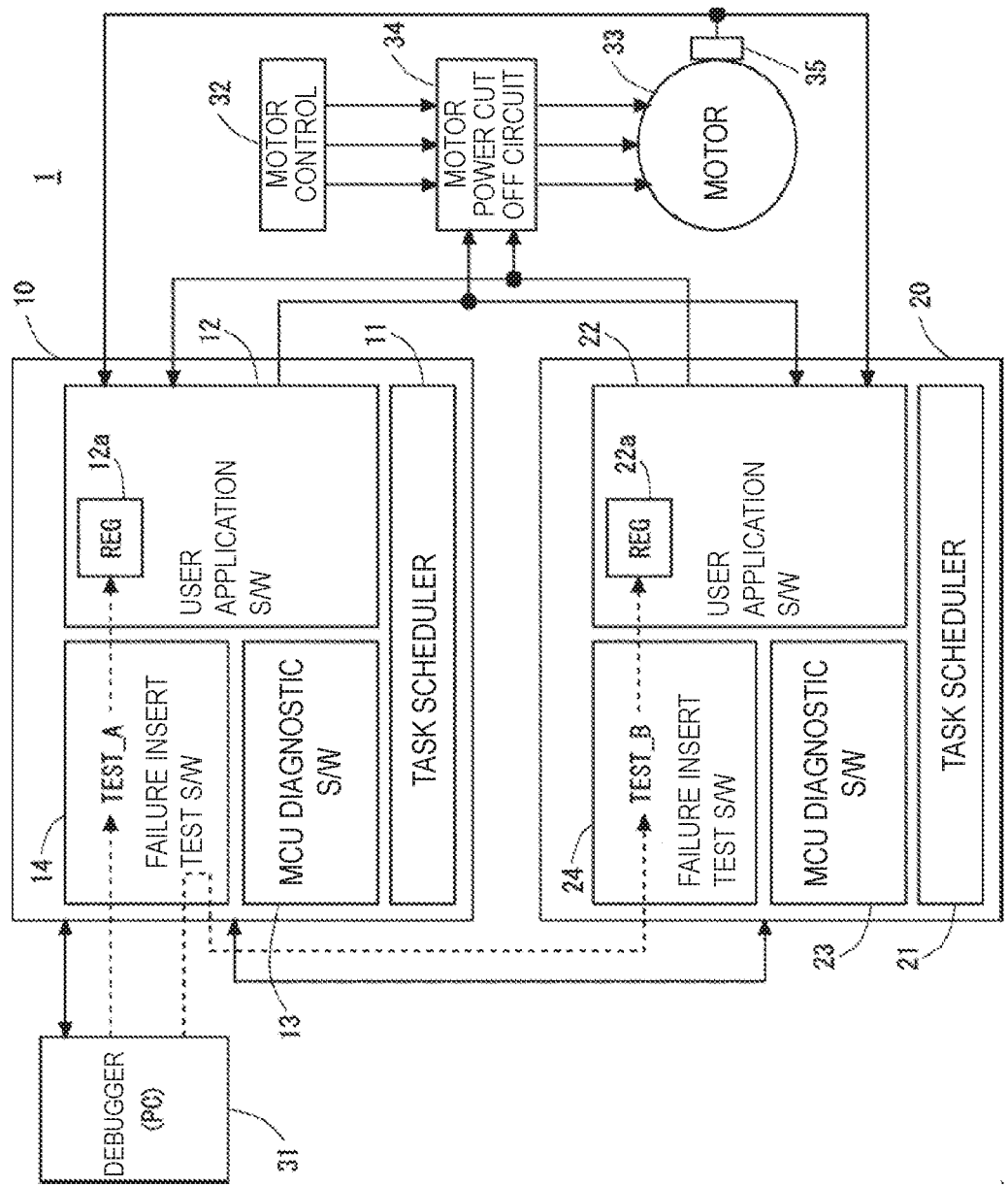
FIG. 1 is a schematic diagram of a safety control system according to the first embodiment.

For clarity of explanation, the following description and drawings are appropriately omitted and simplified. In addition, the elements described in the drawings as functional blocks for performing various processes can be configured as a CPU (Central Processing Unit), a memory, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., a flexible disk, a magnetic tape, a hard disk drive), magneto-optical recording media (e.g., a magneto-optical disk), CD-ROM (a Read Only Memory, a CD-R, a CD-R/W, a solid-state memory (e.g., a masked ROM, a PROM (Programmable ROM), an EPROM (an Erasable PROM, a flash ROM, a RAM (Random Access Memory)). The program may also be supplied to the computer by various types of transitory computer-readable media. Examples of transitory computer-readable media include an electrical signal, an optical signal, and an electromagnetic wave. The transitory computer readable medium may provide the program to the computer via a wired or wireless communication path, such as an electrical wire and an optical fiber.

First Embodiment

FIG. 1 is a schematic diagram of a safety control system according to the first embodiment.

In the example shown in FIG. 1, the system for controlling the motor 33 is functionally and safely supported. However, the control target circuit controlled by the safety control system 1 is not limited to the motor, and various functions can be considered.

As shown in FIG. 1, the safety control system 1 according to the first embodiment includes a first semiconductor device (e.g., a first MCU10), a second semiconductor device (e.g., a second MCU20), a motor control circuit 32, a motor power cut off circuit 34, a motor 33, and a rotational angle sensor 35. FIG. 1 shows a debugger 31 for debugging the software installed in the first MCU10 and the software installed in the second MCU20. The first MCU10 and the second MCU20 are MCUs (Micro Controller Unit) in which an arithmetic unit for executing a program, a memory used by the arithmetic unit, and peripheral circuits for realizing various functions are formed on one semiconductor chip.

In the safety control system 1 according to the first embodiment, the first MCU10 and the second MCU20 detect an abnormality of the control target circuit (for example, the motor 33), and perform safety control for safely stopping the motor 33. In the example shown in FIG. 1, the control target circuit includes a motor control circuit 32, a motor 33, a motor power cut off circuit 34, and a rotation angle sensor 35. The motor control circuit 32 controls the rotation speed, the rotation torque etc. of the motor 33. The motor power cut off circuit 34 is provided between the motor control circuit 32 and the motor 33, and stops the motor 33 by cutting off the drive signals supplied from the motor control circuit 32 to the motor 33 when the first MCU10 or the second MCU20 determined occurring an abnormality in rotating of the motor 33. The rotation angle sensor 35 detects the rotation angle of the motor 33 at a predetermined cycle, and outputs rotation angle data to the first MCU10 and the second MCU20. Then, in the safety control system 1, when an abnormality is detected in the rotation angle data obtained from the rotation angle sensor 35 in at least one of the user application 12 executing in the first MCU10 and the user application 22 executing in the second MCU20, the safety control system 1 outputs an operation stop signal to the motor control circuit 32 by at least one of the task scheduler 11 and the user application 12, and stops the motor 33.

In the safety control system 1 according to the first embodiment, the first MCU10 and the second MCU20 communicate with each other mutually and the operation of the first MCU10 and the second MCU20 is verified by mutually receiving diagnostic information of the other MCU, thereby ensuring the functional safety of the system.

In the first MCU10 and the second MCU20, the same software is executed so that substantially the same software results are obtained. In addition to the software shared by the two MCUs described above, software differing from each other may be executed in the first MCU10 and the second MCU20. Hereinafter, software common to the two MCUs will be described in detail.

In the embodiment shown in FIG. 1, in a first MCU10, a task scheduler 11, a user application 12, MCU diagnostic software 13, and failure insert test software 14 are executed. These software programs are executed by a calculation unit of the first MCU10, which will be described later in detail.

The task scheduler 11 switches which of the user application 12, the MCU diagnostic software 13, and the MCU diagnostic software 13 is executed. The user application 12 is software installed by a user who uses the first MCU10, and in the embodiment shown in FIG. 1, the user application 12 performs a process of detecting an abnormality of the motor 33 and a process of stopping the operation of the motor 33. FIG. 1 shows a register 12a used by the user application 12 in the abnormality detection process.

The MCU diagnostic software 13 performs an abnormality detection process for detecting an operation abnormality of the user application 12 and the failure insert test software 14. Further, the MCU diagnostic software 13 performs self-diagnostic processing for monitoring its own operation state. Then, the MCU diagnostic software 13 generates first diagnostic information including the results of the abnormality detection processing and the self-diagnostic processing. The MCU diagnostic software 13 communicates with the MCU diagnostic software 23 installed on the second MCU20, receives the second diagnostic information generated by the second MCU20, and performs a mutual diagnostic process for diagnosing the validity of the operation of the second MCU20 based on the received second diagnostic information.

The failure insert test software 14 is a first operation verifying program. The failure insert test software 14 manipulates the value stored in the register 12a used by the user application 12 based on an instruction from the debugger 31. When receiving a particular operation setting command from the debugger 31, the failure insert test software 14 outputs trigger signals to the first MCU10 based on the operation verifying command.

In the second MCU20, the task scheduler 21, the user application 22, the MCU diagnostic software 23, and the failure insert test software 24 are executed. Like the first MCU10, these softwares are executed in the arithmetic unit of the second MCU20.

The user application 22 and the MCU diagnostic software 23 perform substantially the same operations as those of the task scheduler 11, the user application 12, and the MCU diagnostic software 13, and a description thereof is omitted here.

The MCU diagnostic software 23 communicates with the MCU diagnostic software 13 installed on the first MCU10, receives the first diagnostic information generated by the first MCU10, and performs a mutual diagnostic process for diagnosing the validity of the operation of the first MCU10 based on the received first diagnostic information.

The failure insert test software 24 is a second operation verifying program. The failure insert test software 24 receives the operation verifying command from the debugger 31 via the failure insert test software 14 of the first MCU10, and manipulates the values stored in the register 22a used by the user application 22 based on the received operation verifying command. When receiving the operation verifying command, the failure insert test software 24 transfers the operation setting command to the second MCU20.

In FIG. 1, the functions realized by the first MCU10 and the second MCU20 are described by software, but the first MCU10 and the second MCU20 have hardware for executing software.

Figure 2:
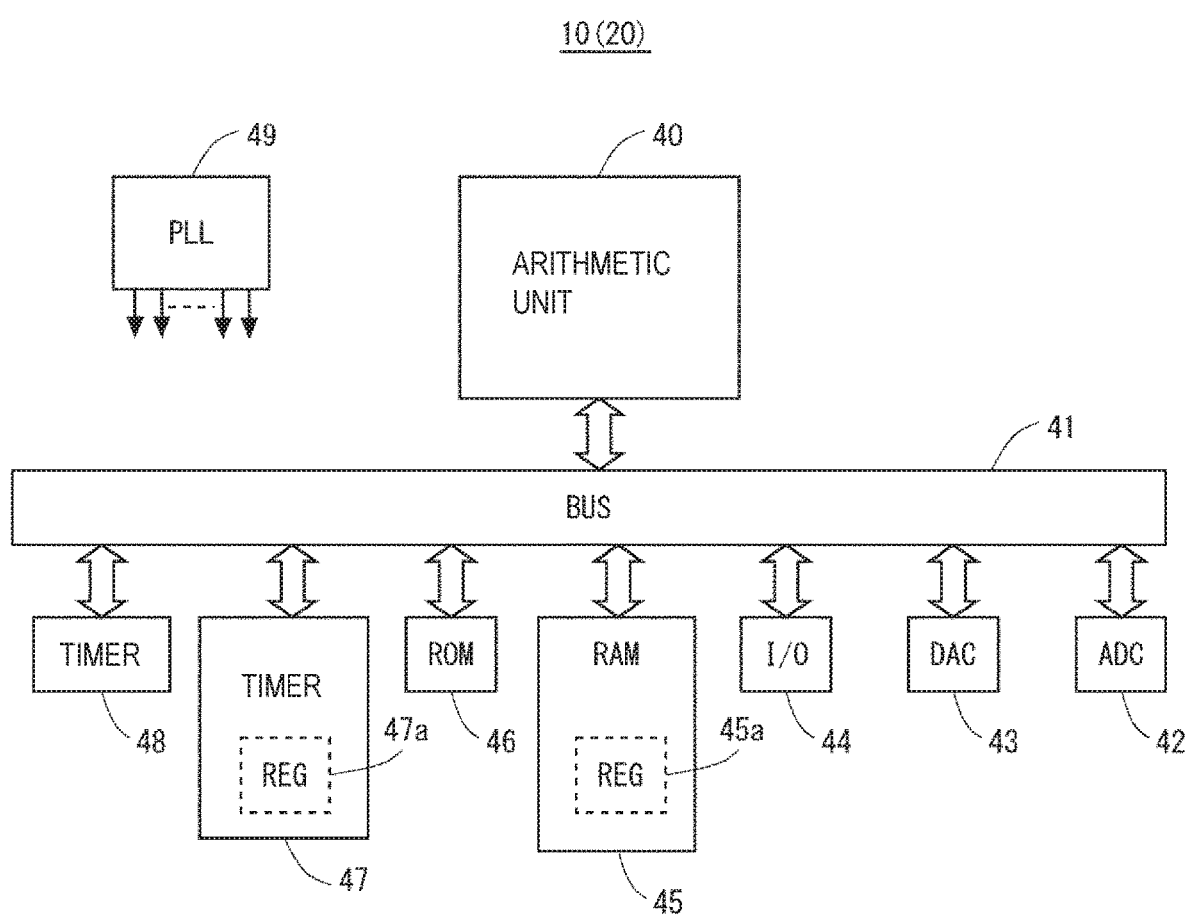
FIG. 2 is a schematic diagram of a semiconductor device according to the first embodiment.

FIG. 2 is a schematic diagram of a semiconductor device according to the first embodiment.

The example shown in FIG. 2 is an example of the first MCU10 and the second MCU20, and the first MCU10 is shown as an example of the semiconductor chip in FIG. 2.

As shown in FIG. 2, the first MCU10 includes an arithmetic unit 40, a bus 41, an analog-to-digital conversion circuit 42, a digital-to-analog conversion circuit 43, an I/O interface circuit 44, a RAM (Random Access Memory) 45, a ROM (Read Only Memory) 46, timers 47 and 48, and a PLL (Phase Locked Loop) circuit 49. In the example shown in FIG. 2, the analog-to-digital conversion circuit 42, the digital-to-analog conversion circuit 43, the I/O interfacing circuit 44, the RAM45, ROM46, and the timers 47 and 48 are shown as examples of the peripheral circuit group. The peripheral circuit group is a hardware resource used by software executed by the arithmetic unit 40. The PLL circuit 49 generates clock signals and distributes the clock signals to the blocks in the first MCU10. The bus 41 interconnects the arithmetic unit 40 and the peripheral circuit group.

The arithmetic unit 40 executes an OS (Operation System), and executes the user application 12, the MCU diagnostic software 13, and the failure insert test software 14 in a time-sharing manner by using a task scheduler provided in the OS.

The analog-to-digital conversion circuit 42 converts an analog signal input from the outside into a digital value corresponding to the signal level, and outputs the digital value. For example, a value obtained by converting the rotation angle information obtained from the rotation angle sensor 35 into a digital value is output. The digital-to-analog conversion circuit 43 outputs an analog signal having an analog signal level corresponding to the digital value generated by the arithmetic unit 40.

The I/O interface circuit 44 transmits and receives digital signals between the first MCU10 and another device. For example, in the first MCU10, communication in accordance with standards such as USB (Universal Serial Bus) and UART (Universal Asynchronous Receiver/Transmitter) or communication by digital signals that can be user-assigned is performed by using the I/O interface circuit 44. The RAM45 is a volatile memory for storing values used when the arithmetic unit 40 executes the software. In the first MCU10, a register 12a used by the user application 12 is set in this RAM45, and in the case shown in FIG. 2, this register 12a is denoted by 45a.

The ROM46 is, for example, a non-volatile memory in which stores the user application 12, the MCU diagnostic software 13, the failure insert test software 14, and the like. The timers 47 and 48 measure the execution time of the program in the arithmetic unit 40 and the time required for the program executed in the arithmetic unit 40. In the example shown in FIG. 2, a register 47a for storing a time specification value by a program executed by the arithmetic unit 40 is shown.

Figure 3:
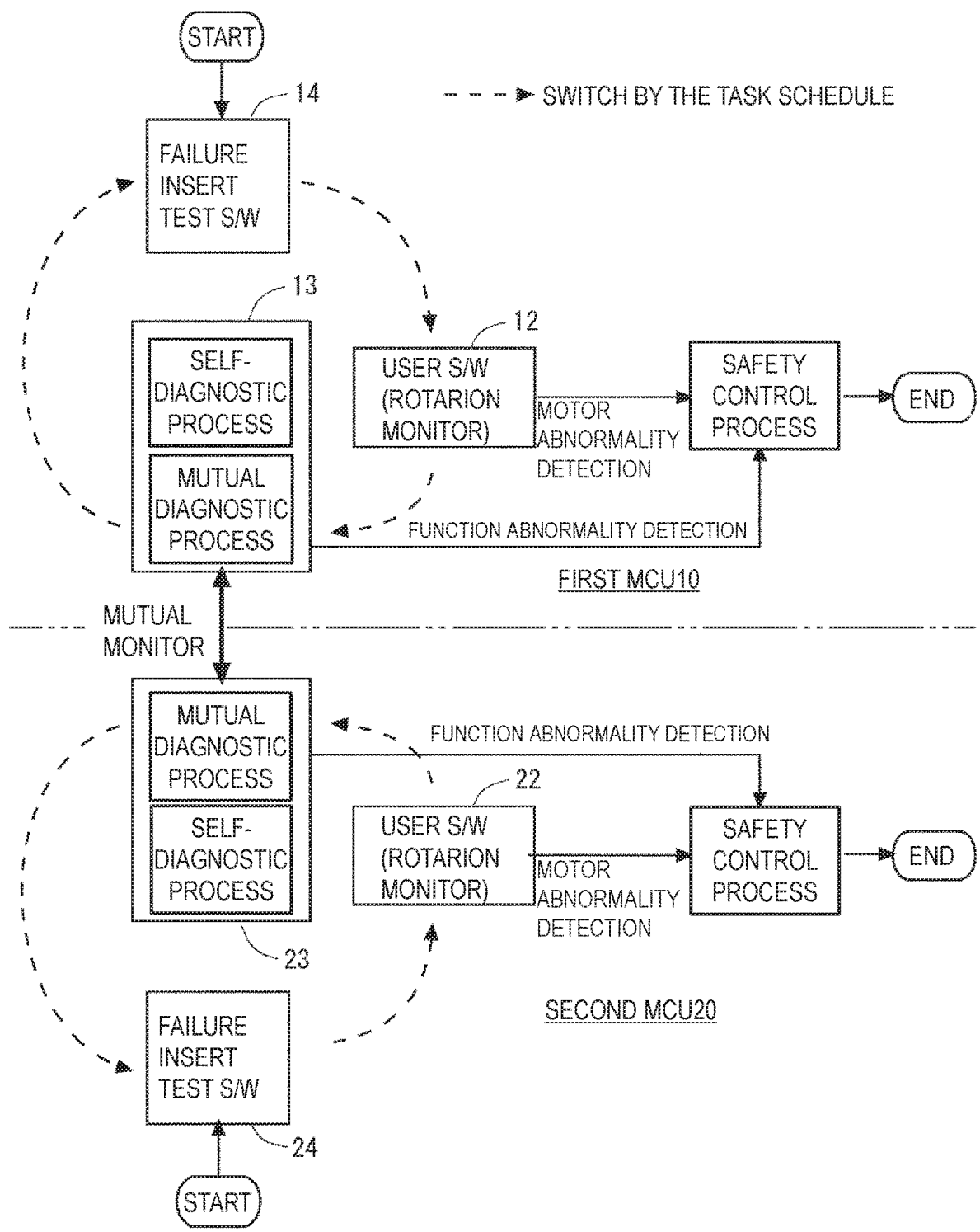
FIG. 3 is a diagram for explaining an operation switching process of software of the safety control system according to the first embodiment.

Next, the operation of the safety control system 1 shown in FIG. 1 will be described. FIG. 3 is a diagram for explaining an operation switching process of software of the safety control system according to the first embodiment.

As shown in FIG. 3, in the safety control system 1 according to the first embodiment, the safety control system 1 performs the same process while switching the software to be executed by the first MCU10 and the second MCU20.

The first MCU10 and the second MCU20 switch the software to be executed by the task schedulers 11 and 21. More specifically, in the first MCU10 and the second MCU20, the failure insert test software, the user application, and the MCU diagnostic software are executed while switching the software to be executed in predetermined cycles in the order of the failure insert test software, the user application, and the MCU diagnostic software. Further, in the first MCU10 and the second MCU20, at least one of the self-diagnostic process and the mutual diagnostic process is executed at the timings at which the MCU diagnostic software is executed. The MCU diagnostic software 13 and the MCU diagnostic software 23 monitor the operation of each other in the mutual diagnostic process.

In addition, the first MCU10 and the second MCU20 terminate the operation after executing the safety control process of the user application 12 or the user application 22 and stopping the system when an abnormality of the function is detected in at least one of the MCU diagnostic software 13 and the MCU diagnostic software 23. Further, when an abnormal state of the motor 33 is detected in the processing of the user application 12 or 22, the first MCU10 and the second MCU20 execute the safety control process of the user application to stop the system, and then terminate the operation. In industrial equipment, when an abnormality occurs, it is required for safety control that the system is not restored to the operating state unless repair or special operation is performed. This is a necessary measure to prevent the spread of accidents and failures.

Although the first MCU10 and the second MCU20 according to the first embodiment are described as having the same configuration, the first MCU10 and the second MCU20 may have different configurations and different throughput.

Next, the operation of the safety control system 1 according to the first embodiment will be described focusing on the operation of the failure insert test software 14.

Figure 4:
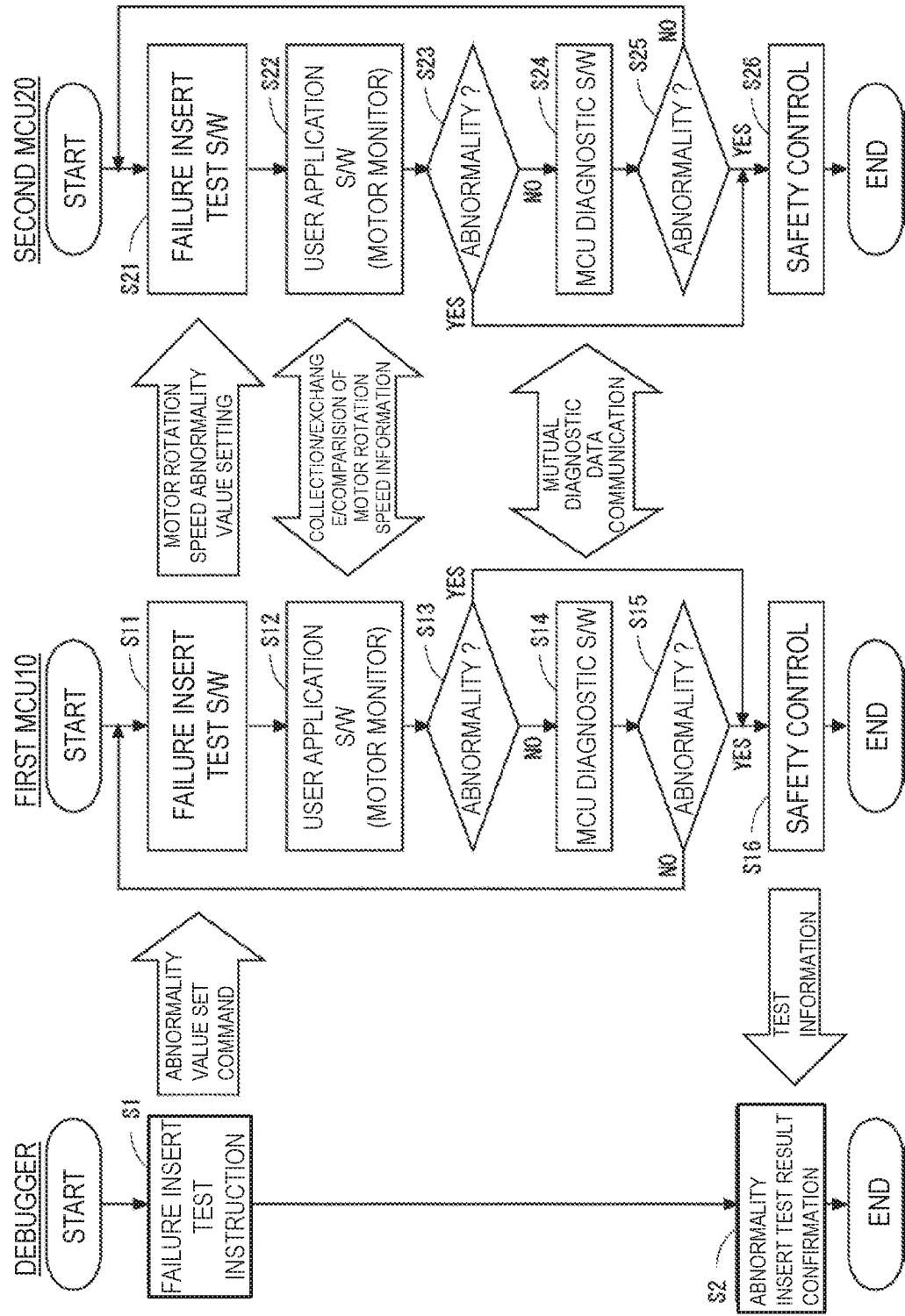
FIG. 4 is a flow chart explaining a process flow of the safety control system according to the first embodiment.

FIG. 4 is a flow chart explaining a process flow of the safety control system according to the first embodiment.

In FIG. 4, the process indicated by the one-sided arrow from the first MCU10 side to the second MCU20 side is a process caused by the process of transmitting data executed by the failure insert test software 14. Further, in FIG. 4, the process indicated by the double-headed arrow between the first MCU10 side and the second MCU20 side is a process caused by the data transmission/reception process executed by the MCU diagnostic software.

As shown in FIG. 4, in the safety control system 1 according to the first embodiment, the first MCU10 and the second MCU20 first execute the failure insert test software 14 and the failure insert test software 24 in steps S11 and S21. Here, the failure insert test software 14 receives the abnormal value setting command as one of the operation verifying commands from the debugger 31, and transfers the received abnormal value setting command to the failure insert test software 24 of the second MCU20. In steps S12 and S22, the first MCU10 and the second MCU20 execute the user application 12 and the user application 22. In the process of steps S12 and S22, the user application 12 and the user application 22 monitor whether the motor 33 is abnormality based on the rotation angle information obtained from the rotation angle sensor 35 or not. When it is determined that the motor 33 is an abnormality in the processes of steps S12 and S22 (YES branch of steps S13 and S23), the safety control system 1 performs a safety control process of stopping the motor 33 (steps S16 and S26).

On the other hand, when it is determined in the processes of steps S12 and S22 that the motor 33 is no abnormality (NO branch of steps S13 and S23), the safety control system 1 switches the software executed in the first MCU10 and the second MCU20 to the MCU diagnostic software 13 and the MCU diagnostic software 23 (steps S14 and S24). When it is determined that the motor 33 is an abnormality in the processes of steps S14 and S24 (YES branch of steps S15 and S25), the safety control system 1 performs a safety control process of stopping the motor 33 (steps S16 and S26). On the other hand, when it is determined in the processes of steps S14 and S24 that the motor 33 is no abnormality (NO branch of steps S15 and S25), in the safety control system 1, the software to be executed by the first MCU10 and the second MCU20 is used as the failure insert test software 14 and the failure insert test software 24. In the safety control system 1 according to the first embodiment, the debugger 31 obtains test information indicating a test result from the first MCU10 and the second MCU20 each time the process of steps S11 to S15 (or step S16) is completed (step S2).

The operation of the user application, the MCU diagnostic software, and the failure insert test software will now be described in detail. In the safety control system 1 according to the first embodiment, the user application performs a process of detecting a rotation abnormality of the motor 33 and a safety control process when the rotation abnormality is detected. The user application performs rotation abnormality detection process based on whether or not the rotation angle information stored in the register 12a exceeds a predetermined range, for example. When an abnormality is detected by the rotation abnormality detection process, the user application performs a safety control process of giving an instruction to the motor power cut off circuit 34 to stop the motor 33. Further, user application information such as the rotation angle information of the register 12a collected by the user application and the operation state information indicating the operation state of the user application is collected. In the safety control system 1 according to the first embodiment, the MCU diagnostic software generates diagnostic information including user application information collected by the user application in the MCU diagnostic software device, and the first MCU10 side and the second MCU20 side mutually transmit and receive diagnostic information. Thereafter, in a first MCU10, the second user application information generated on the second MCU20 side and the first user application information generated on the first MCU10 side are compared. By this comparing process, when there is a difference between the user application information of the first MCU10 and the user application information of the second MCU20, it is determined that a failure has occurred in either the first MCU10 or the second MCU20, and it is determined that an abnormality has occurred in steps S15 and S25. The abnormality detecting process between the MCUs based on the user application information of each other is also performed on the second MCU20 side. Next, the operation of the failure insert test software 14, 24 will be described. The failure insert test software 14 and 24 operate in cooperation with each other to control the execution states of registers and programs used by the user application in synchronization between the two MCUs. In the examples shown in the first embodiment, the failure insert test software 14, 24 manipulates the rotational angle data stored in the registers 12a, 22a used by the user applications 12, 22 at synchronized times. The failure insert test software 14 or 24 performs the above described operation based on an operation verifying command (e.g., an abnormal value setting command) output from the debugger 31.

Figure 5:
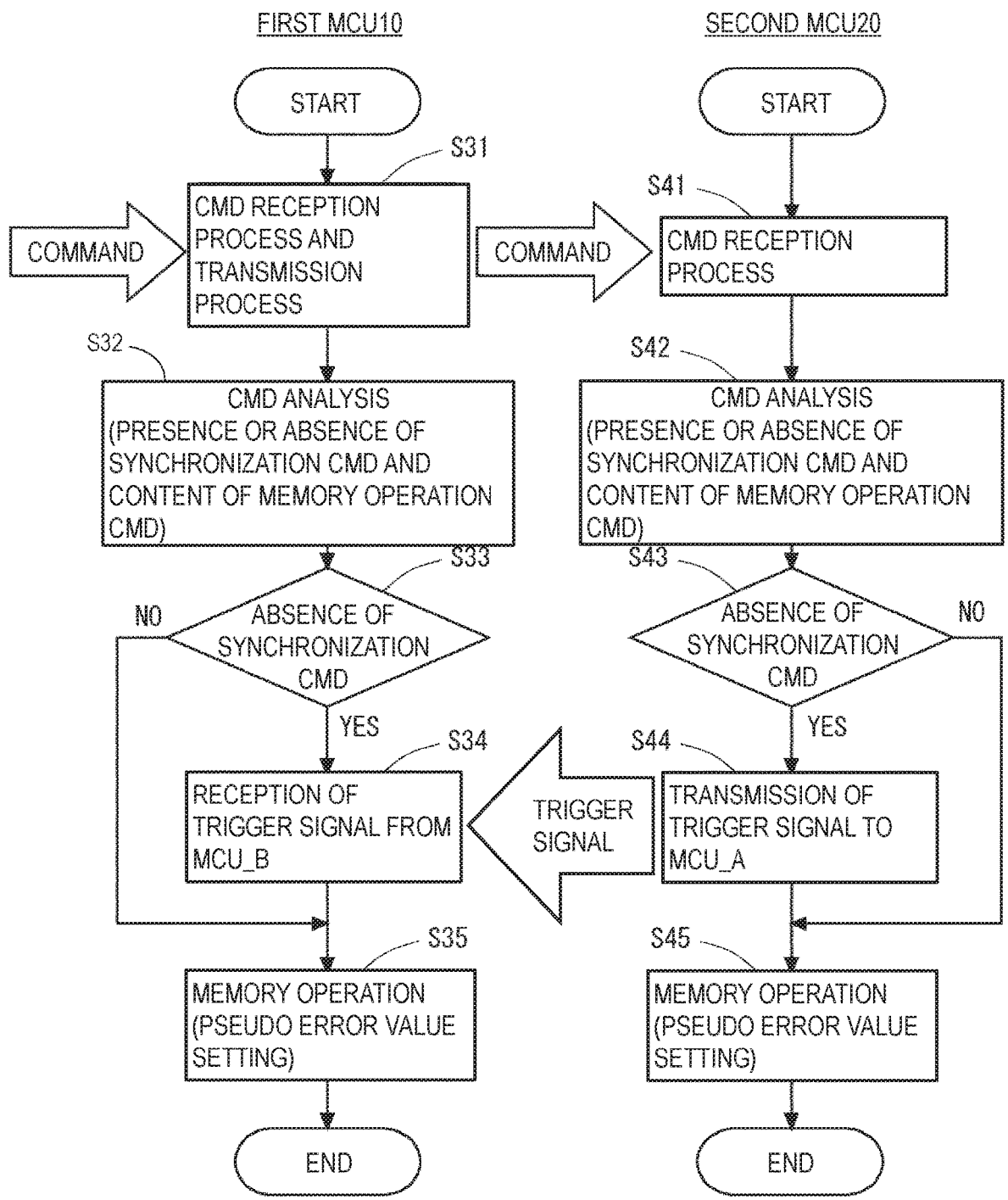
FIG. 5 is a flow chart for explaining a process flow of a failure insert test software (operation verifying program) according to the first embodiment.

Therefore, FIG. 5 is a flow chart for explaining the process flow of the failure insert test software (operation verifying program) according to the first embodiment.

FIG. 5 is a flow chart for explaining a process flow of a failure insert test software (operation verifying program) according to the first embodiment.

As shown in FIG. 5, in the safety control system 1 according to the first embodiment, the failure insert test software 14 executed in the first MCU10 to which the debugger 31 is coupled performs a first command reception process for receiving an operation verifying command from the debugger 31, and a command relaying process for transmitting an operation verifying command (for example, an abnormal value setting command) received by the first command reception process to the second MCU20 (step S31). In step S41, the failure insert test software 24 executed by the second MCU20 performs a second command reception process for receiving the abnormal value setting command transferred from the first MCU10 (step S41).

Next, in step S32, the failure insert test software 14 performs a first command analysis process for analyzing the abnormal value setting command received in step S31 (step S32). In the example shown in FIG. 5, the abnormal value setting command includes the presence or absence of a synchronization command instructing to perform an operation synchronized with the other MCU and a memory operation command indicating the content of the memory operation. In the first command analysis operation, the presence or absence of the synchronization command and the memory operation command in the abnormal value setting command are extracted. The failure insert test software 24 performs the same processing as in step S32 in step S42.

Subsequently, when it is determined in the processing of steps S32 and S42 that the abnormal value setting command does not include the synchronization command, the failure insert test software 14 or 24 writes the memory setting value specified by the memory operation command in the register specified by the memory operation command in steps S35 and S45. When the abnormal value setting command does not include the synchronization command, the first MCU10 and the second MCU20 perform the memory operation process of steps S35 and S45 at independent timings.

On the other hand, if it is determined in the processing of steps S32 and S42 that the abnormal value setting command includes a synchronization command, the failure insert test software 14 or 24 performs synchronization processing in steps S34 and S44. In the synchronization processing, the failure insert test software 14 performs the wait processing (step S34), and the failure insert test software 24 performs the first trigger signal output process (step S44). In the wait processing, the processing performed by the arithmetic unit 40 is stopped until the first trigger signal outputted by the second MCU20 is inputted, and is set to the standby state. In the first trigger signal output process, the first trigger signal is outputted to the first MCU10 based on the synchronization command in the abnormal value setting command.

The failure insert test software 14 performs a first memory operation process for giving a first memory setting value (e.g., a pseudo error value) included in the abnormal value setting command to a memory (e.g., the register 12a) in the first MCU10 used by the user program based on a memory operation command included in the abnormal value setting command based on the first trigger signal (step S35).

Further, in response to outputting the first trigger signal, the failure insert test software 24 performs a second memory operation process for giving a second memory setting value (e.g., a pseudo error value) included in the abnormal value setting command to a memory (e.g., the register 22a) in the second MCU20 used by the user program based on the memory operation command included in the abnormal value setting command (step S45).

In other words, the failure insert test software 14, 24 performs the first memory operation processing and the second memory operation processing at synchronized times based on the first trigger signal.

The safety control system 1 according to the first embodiment can be regarded as an abnormality detecting device for detecting an abnormality in a subject (for example, the motor 33). the safety control system 1 includes a first semiconductor device (e.g., a first MCU10) having a first memory (e.g., register 12a) and a second semiconductor device (e.g., a second MCU20) having a second memory (e.g., 22a). The first MCU10 transmits a command inputted from the outside of the safety control system 1 from the first MCU10 to the second MCU20. The second MCU20 outputs first trigger signals to the first MCU10 based on information included in the command. Thereafter, the first MCU10 operates the register 12a when the first MCU10 receives the first trigger signal, and the second MCU20 operates the register 22a at the same time as the first MCU10.

The first MCU10 inputs a command from an external debugger, for example, the debugger 31. The first MCU10 and the second MCU20 detect the failure information from the information of the register 12a and the register 22a and transition to the safe condition. Then, the first MCU10 outputs information indicating the move to the safe state to the debugger 31.

In addition, a first operation verifying program executed in the first MCU10 is installed on the first MCU10, and a second operation verifying program executed in the second MCU20 is installed on the second MCU20. Here, the command includes synchronous inquiry information instructing whether or not the memory operation for the register 12a and the register 22a is performed synchronously to the first operation verifying program and the second operation verifying program.

As described above, in the safety control system 1 according to the first embodiment, the failure insert test software 14 and 24 supply the setting values required for debugging to the first MCU10 and the second MCU20 at timings synchronized with the first MCU10 and the second MCU20 by operation verifying commands outputted from the debugger 31.

For example, in the safety control system 1 shown in FIG. 1, when a rotational abnormality of the motor 33 is detected, error values need to be written at timings synchronized with the register 12a of the first MCU10 and the register 22a of the second MCU20. When the debugger 31 verifies whether such a state can be detected by the user applications 12 and 22, there is a problem that the error values cannot be written in the registers 12a and 22a at timing synchronized with each other in the conventional method. However, in the safety control system 1 according to the first embodiment, by using the failure insert test software 14 and 24, it is possible to write error values in the registers 12a and 22a at synchronous timings by including a synchronization command in the operation verifying command outputted from the debugger 31.

As described above, the safety control system 1 according to the first embodiment can perform memory operations on two MCUs at synchronous times by using the debugger 31.

The Second Embodiment

The second embodiment describes another operation of the failure insert test software 14, 24. In the description of the second embodiment, the same components as those of the first embodiment are denoted by the same reference numerals, and description thereof is omitted. Since the safety control system according to the second embodiment uses the same hardware configuration as the safety control system 1 according to the first embodiment, the explanation of the hardware configuration is omitted in the second embodiment.

Figure 6:
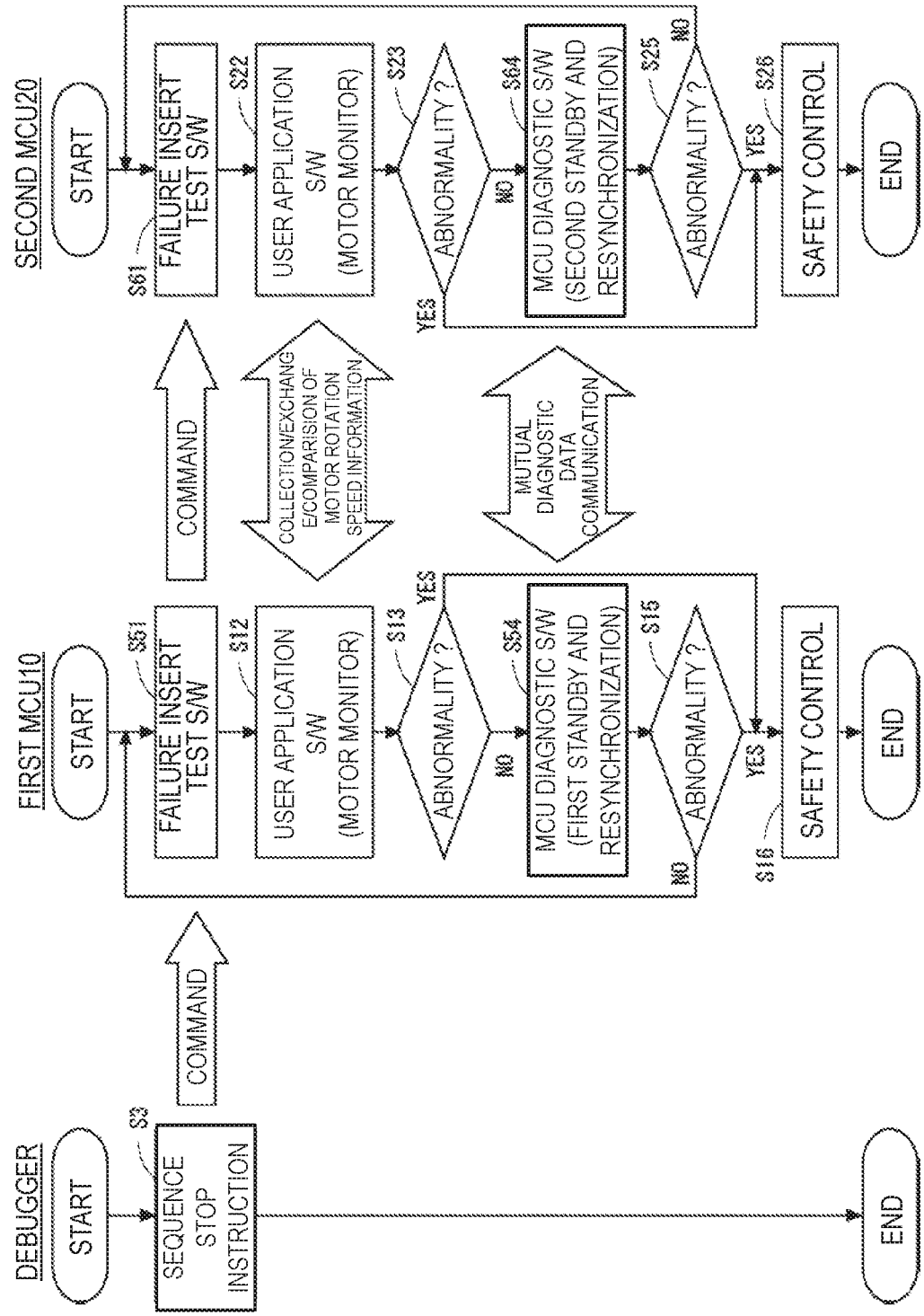
FIG. 6 is a flow chart explaining a process flow of the safety control system according to the second embodiment.

FIG. 6 is a flow chart explaining a process flow of the safety control system according to the second embodiment.

As shown in FIG. 6, the operation of the safety control system according to the second embodiment is performed by replacing steps S11 and S21 with steps S51 and S61, and replacing steps SS14 and S24 with steps S54 and S64. In steps S51 and S61, instead of setting the pseudo error value, a value for stopping the program execution is set in the registers 12a and 22a. The details of the program execution stop processing will be described later. In addition to the diagnostic process by the MCU diagnostic software 13 in step S14, the process in step S54 has a first standby function and a resynchronization function for waiting for the execution of the software until the timeout error detection function relating to the process in the arithmetic unit 40 is switched from invalid to valid. The process of step S64 has a second standby function and a resynchronization function for stopping the process until the second trigger signal supplied from the first MCU10 is inputted, in addition to the diagnostic process performed by the MCU diagnostic software 13 of step S24.

The functions added in steps S54 and S64 are realized by the failure insert test software 14 and 24 operating the registers used by the MCU diagnostic software 13 and 23 based on the instruction in the operation verifying command output from the debugger 31 in steps S51 and S61.

Figure 7:
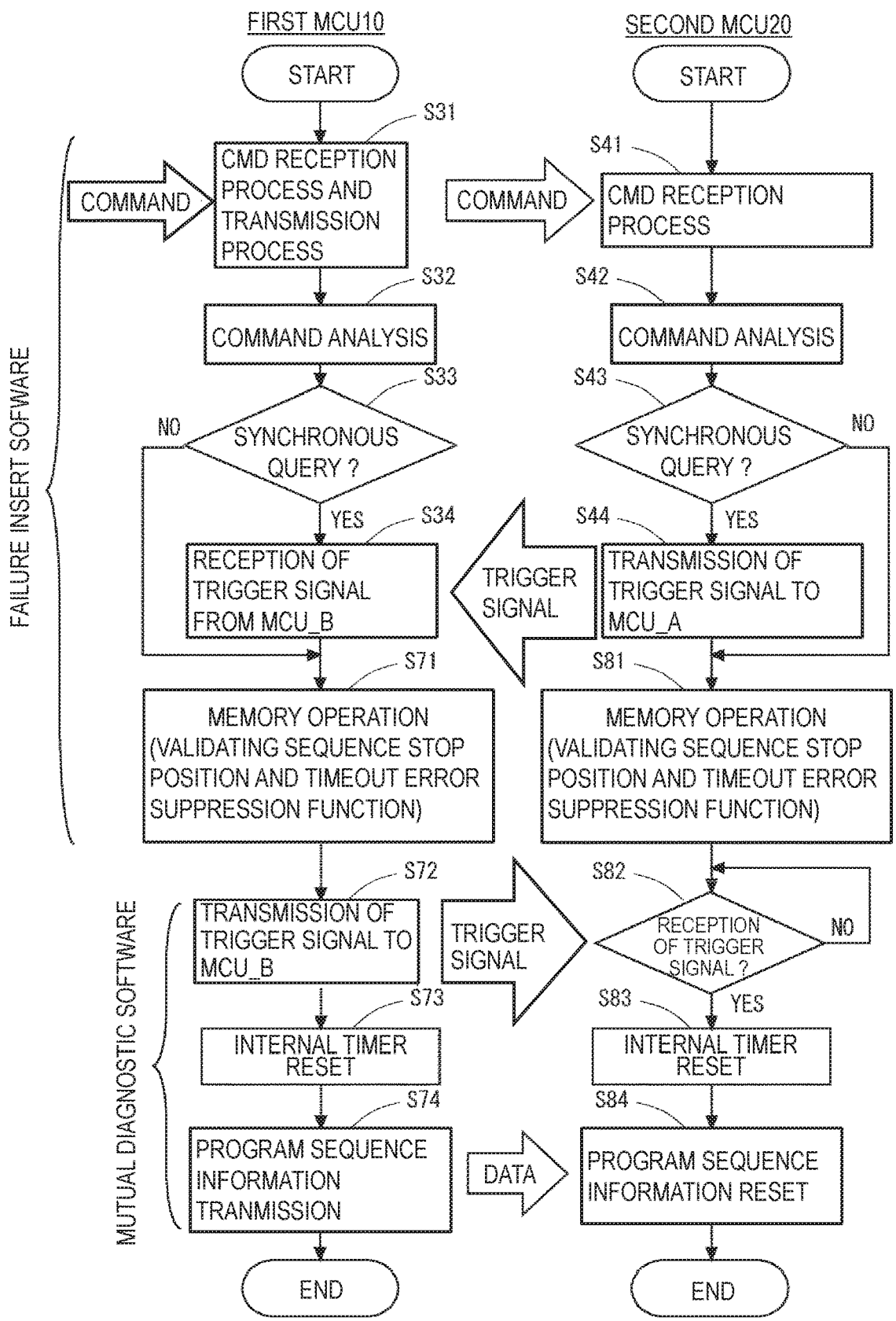
FIG. 7 is a flow chart for explaining a process flow of a failure insert test software (operation verifying program) according to the second embodiment.

Therefore, FIG. 7 is a flow chart for explaining a process flow of a failure insert test software (operation verifying program) according to the second embodiment.

As shown in FIG. 7, the operation of the failure insert test software 14 according to the second embodiment performs the operations of steps S31 to S34 and S71 as the process of step S51, and the failure insert test software 24 performs the operations of steps S41 to S44 and S81 as the process of step S61. Here, the flow up to the wait processing in steps S34 and S44 and the flow up to the first trigger signal output process are the same as those of the failure insert test software 14 and 24 according to the first embodiment shown in FIG. 5.

On the other hand, in the examples described in second embodiment, the contents of the memory operation processes are different from the steps S35 and S45. Therefore, in the example shown in FIG. 7, the code assigned to the memory operation process is changed from steps S35 and S45 to steps S71 and S81. The process of step S71 is a first memory operation process, and the process of step S81 is a second memory operation process. In the failure insert test software 14, 24 according to the second embodiment, in the memory operation process of steps S71, S81, the memory setting values including the stop position setting value (e.g., sequence stop position information) and the first function valid setting value (e.g., timeout error suppression function information) in the operation verify command are stored in the registers 12a, 22a.

Here, the sequence stop position information is information indicating a stop position of the execution sequence of the program. The timeout error suppression function information is information for invalidating the timeout error function for outputting an error when the execution time of the user program exceeds a preset execution permission time.

By storing such memory setting values in the registers 12a and 22a, the first MCU10 and the second MCU20 stop the user application 12 and 22 at the sequence position based on the sequence stop position information. The first MCU10 and the second MCU20 disable the timeout error detecting function of the MCU diagnostic software 13 and 23 based on the timeout error suppression function data.

Thus, for example, even when the debugger 31 debugs the user application 12 installed on the first MCU10, the debugger 31 can perform debugging without detecting errors in the self-diagnostic operation and the mutual diagnostic process by the MCU diagnostic software 13, 23. That is, when the program is stopped by the failure insert test software 14, 24, the process of steps S12, S13 and steps S22, S23 in FIG. 6 is processed without causing an error, and after the operation of the failure insert test software 14, 24 is completed, the MCU diagnostic software 13, 23 is operated.

When the memory operation process of steps S71 and S81 is completed and debugging by the debugger 31 is completed, the debugger 31 transmits a trigger signal output instruction and a program sequence restart instruction to the first MCU10. As a result, the MCU diagnostic software 13 outputs a second trigger signal to the MCU diagnostic software 23 of the second MCU20 (e.g., a second trigger signal outputting process (S72)). Further, in response to outputting the second trigger signal, the MCU diagnostic software 13 resets (resets the value to the register 47a in the timer) the timer in the first MCU10 (first timer resetting process, step S73). Further, the MCU diagnostic software 13 sets the program sequence restart position in the MCU diagnostic software 13 based on the restart position information of the program sequence (first program synchronization process, step S74). In the first program synchronization process of S74, the MCU diagnostic software 13 transmits the program sequence restart position information to the MCU diagnostic software 23 of the second MCU20.

On the other hand, the respective programs installed on the second MCU20 are in a standby status until they receive the second trigger signal from the first MCU10 (the second trigger signal receiving process, S82). Then, the MCU diagnostic software 23 restarts the operation in response to the reception of the second trigger signal. At this time, the MCU diagnostic software 23 resets (resets the values to the register 47a in the timer) the timer in the second MCU20 (second timer resetting processing, step S83). Further, the MCU diagnostic software 23 receives the restart position information of the program sequence from the MCU diagnostic software 13 of the first MCU10, and sets the program sequence restart position based on the restart position information of the received program sequence (second program synchronization process, S84).

Also in the safety control system according to the second embodiment, a first operation verifying program executed in the first MCU10 is installed on the first MCU10, and a second operation verifying program executed in the second MCU20 is installed on the second MCU20. In the second embodiment, the second MCU20 performs a memory operation for specifying a stop position for stopping the second operation verifying program to the register 22a based on the commands, and stops the second operation verifying program when the memory operation reaches the stop position of the specified second operation verifying program. The second MCU10 starts executing the second operation verifying program again when the second trigger signal outputted from the first MCU10 is inputted.

In addition, the second MCU20 performs a memory operation for enabling the timeout error suppression process in accordance with the setting of the stopping position of the second operation verifying program. Thereafter, when the second trigger signal is inputted from the first MCU10, the second MCU20 invalidates the timeout error suppression process.

Also, the first MCU10 has a first timer and the second MCU20 has a second timer. Then, the first MCU10 resets the first timer in response to outputting the second trigger signals. Further, the second MCU20 resets the second timer when the second trigger signal is inputted from the first MCU10.

In the above description, the MCU diagnostic software 13, 23 performs the operation of steps S72 to S74 and steps S82 to S84 using the mutual communication function, but in this case, the MCU diagnostic software 13, 23 has the memory operation function of the failure insert test software 14, 24. However, the MCU diagnostic software 13, 23 and the failure insert test software 14, 24 may cooperate to cause the failure insert test software 14, 24 to perform the process of steps S72 to S74 and steps S82 to S84 using the mutual communication function of the MCU diagnostic software 13, 23.

As described above, in the safety control system according to the second embodiment, the failure insert test software 14, 24 controls the values of the registers used by the programs installed in the MCUs, thereby stopping the sequence of executing the programs. In the safety control system 1 according to the second embodiment, by operating the values of the registers used by the programs installed in the respective MCUs by the failure insert test software 14, 24, a timeout error is detected by the stop of the program sequences and an abnormal stop of the programs executed in the respective MCUs is prevented.

In the safety control system according to the second embodiment, the program sequences of the two MCUs operating in cooperation with each other can be resumed at synchronized times and synchronized positions based on the instruction from the debugger 31.

This facilitates debugging of the first MCU10 in coordination with the second MCU20 in the safety control system of the second embodiment.

Although the invention made by the inventor has been specifically described based on the embodiment, the present invention is not limited to the embodiment already described, and it is needless to say that various modifications can be made without departing from the gist thereof.

(Additional Statement 1) A safety control system has a first semiconductor device and a second semiconductor device, each of which is executed a user program for detecting abnormality in the control target device based on the same signals obtained from the control target device by an arithmetic unit. The safety control system has a functional safety function for verifying the validity of mutual operation by mutual communication between the first semiconductor device and the second semiconductor device. A first operation verifying program is a program executed by an arithmetic unit of the first semiconductor device and the second semiconductor device and includes the first operation verifying program being executed by the arithmetic unit of the first semiconductor device and the second operation verifying program being executed by the arithmetic unit of the second semiconductor device. The first operation verifying program performs a first command reception process for receiving an operation verifying command from an external device, a command relay process for transmitting the received operation verifying command in the first command reception process to the second semiconductor device, a first command analysis process for analyzing the operation verifying command received in the first command reception process, a wait process for stopping the process performed by the arithmetic unit until the first trigger signal outputted by the second semiconductor device is inputted when it is determined that the synchronization command is included in the operation verifying command received by the first command analysis process, and a first memory operation process for giving the first memory setting value included in the operation verifying command to the memory in the first semiconductor device used by the user program based on the memory operation command included in the operation verifying command based on the first trigger signal. The second operation verifying program performs a second command reception process for receiving an operation verifying command from the first semiconductor device, a second command analysis process for analyzing the operation verifying command received in the second command reception process, a first trigger signal output process for outputting the first trigger signal to the first semiconductor device based on the operation verifying command when it is determined that the operation verifying command includes a synchronization command as a result of the second command analyzing process, a second memory operation process for giving the second memory setting value included in the operation verifying command to the memory in the second semiconductor device used by the user program based on the memory operating command included in the operation verifying command based on the output of the first trigger signal. The first operation verifying program and the second operation verifying program terminate operations in response to completion of the first memory operation process and the second memory operation process. The safety control system of additional statement 1 is that the first memory setting value and the second memory setting value include a pseudo error value detected by the user program. (Additional Statement 3) The safety control system of additional statement 1 is that the first semiconductor device and the second semiconductor device include a timer for measuring an execution time of a program executed by the arithmetic unit, and the first memory setting value and the second memory setting value include a stop position set value for specifying a stop position of the user program, and a first function valid set value for invalidating a timeout error detection function for stopping a timeout error detecting function for outputting an error when an execution time of the user program exceeds a preset execution permitted time. (Additional Statement 4) The safety control system of additional statement 3 includes the first semiconductor device and the second semiconductor device. The first semiconductor device performs a second trigger signal output process for outputting a second trigger signal to the second semiconductor device based on commands given from the external device after the first memory operation process, a first timer resetting process for writing a second function effective setting value for enabling the timeout error detecting function to the memory as the first memory setting value and resetting the timer in the first semiconductor device, and a first program synchronization process for outputting program sequence information for informing the second semiconductor device of a position at which execution of the user program executed by the first semiconductor device is resumed. The first semiconductor device performs the second trigger signal receiving process for receiving the second trigger signal after the second memory operation, second timer resetting process for writing a second function valid setting value for enabling the timeout error detecting function in the memory as the second memory setting value and resetting the timer in the second semiconductor device in response to receiving the second trigger signal, and a second program synchronization process for setting a program execution resuming position based on the program sequence information outputted from the first semiconductor device.

What is claimed is:

1. A non-transitory tangible machine-readable medium storing an operation verifying program in a safety control system, the safety control system including a first semiconductor device and a second semiconductor device, the first semiconductor device and the second semiconductor device each receiving a signal from a control target device, the first semiconductor device and the second semiconductor device respectively including arithmetic units, the arithmetic units each storing a user program for detecting abnormality in the control target device based on the signal received from the control target device, the safety control system having a functional safety function for verifying a validity of mutual operation by mutual communication between the first semiconductor device and the second semiconductor device, the operation verifying program comprising:

a first operation verifying program executed by the arithmetic unit in the first semiconductor device; and a second operation verifying program executed by the arithmetic unit in the second semiconductor device, wherein the first operation verifying program comprises:

a first command reception process for receiving an operation verifying command from an external device;

a command relay process for transmitting the operation verifying command received in the first command reception process to the second semiconductor device;

a first command analysis process for analyzing the operation verifying command received in the first command reception process;

an wait process for stopping a process being performed by the arithmetic unit until a first trigger signal outputted by the second semiconductor device is inputted when a synchronization command is included in the operation verifying command received by the first command analysis process; and a first memory operation process for giving a first memory setting value included in the operation verifying command to a memory in the first semiconductor device used by the user program based on a memory operation command included in the operation verifying command based on the first trigger signal, and wherein the second operation verifying program comprises:

a second command reception process for receiving the operation verifying command from the first semiconductor device;

a second command analysis process for analyzing the operation verifying command received in the second command reception process;

a first trigger signal output process for outputting the first trigger signal to the first semiconductor device based on the operation verifying command when it is determined that the operation verifying command includes the synchronization command as a result of the second command analyzing process; and a second memory operation process for giving a second memory setting value included in the operation verifying command to a memory in the second semiconductor device used by the user program based on the memory operating command included in the operation verifying command based on the output of the first trigger signal, and wherein the first operation verifying program and the second operation verifying program terminate operations in response to completion of the first memory operation process and the second memory operation process.

2. The non-transitory tangible machine-readable medium storing the operation verifying program according to claim 1, wherein the first operation verifying program and the second operation verifying program perform the first memory operation process and the second memory operation process at synchronized times based on the first trigger signal.

3. The non-transitory tangible machine-readable medium storing the operation verifying program according to claim 1, wherein the operation verifying command is provided by an external debugger.

4. The non-transitory tangible machine-readable medium storing the operation verifying program according to claim 1, wherein the user program stops an operation of the control target device when the control target device is determined to be abnormal.

5. The non-transitory tangible machine-readable medium storing the operation verifying program according to claim 1, wherein the first semiconductor device executes the user program, the operation verifying program, and a self-diagnostic program using the arithmetic unit in the first semiconductor device in a time division manner to realize the functional safety function.

6. The non-transitory tangible machine-readable medium storing the operation verifying program according to claim 1, wherein the first memory setting value and the second memory setting value include pseudo error values detected by the user program.

7. The non-transitory tangible machine-readable medium storing the operation verifying program according to claim 1, wherein the first semiconductor device includes a first timer for measuring an execution time of a program executed by the arithmetic unit in the first semiconductor device, wherein the second semiconductor device includes a second timer for measuring an execution time of a program executed by the arithmetic unit in the second semiconductor device, and wherein the first memory setting value and the second memory setting value include a stop position setting value for specifying a stop position of the user program, and a first function valid setting value for invalidating a timeout error detecting function for stopping a timeout error function for outputting an error when an execution time of the user program exceeds a preset execution permitted time.

8. The non-transitory tangible machine-readable medium storing the operation verifying program according to claim 7, wherein the first semiconductor device performs a second trigger signal output process, a first timer resetting process and a first program synchronization process by the first operation verifying program, wherein the second trigger signal output process outputs a second trigger signal to the second semiconductor device based on commands given from the external device after the first memory operation process, wherein the first timer resetting process writes a second function effective setting value for enabling the timeout error detecting function to the memory as the first memory setting value and resets the first timer in the first semiconductor device, and wherein the first program synchronization process outputs program sequence information for informing the second semiconductor device of a position at which execution of the user program executed by the first semiconductor device is resumed, wherein the second semiconductor device performs a second trigger signal receiving process, a second timer resetting process and a second program synchronization process by the second operation verifying program, wherein the second trigger signal receiving process receives the second trigger signal after the second memory operation, wherein the second timer resetting process writes a second function valid setting value for enabling the timeout error detecting function in the memory as the second memory setting value and resets the second timer in the second semiconductor device in response to receiving the second trigger signal, wherein the second program synchronization process sets a program execution resuming position based on the program sequence information outputted from the first semiconductor device.

9. The non-transitory tangible machine-readable medium storing the operation verifying program according to claim 1, wherein the first operation verifying program transmits test information indicating an operation status of the user program to the external device.

10. A synchronous control method for synchronizing an operation of a first semiconductor device and an operation of a second semiconductor device, the first semiconductor device and the second semiconductor device being included in a safety control system, the first semiconductor device and the second semiconductor device each receiving a signal from a control target device, the first semiconductor device and the second semiconductor device each executing a user program for detecting abnormality in the control target device based on the signal received from the control target device, the safety control system verifying a validity of mutual operation by mutual communication between the first semiconductor device and the second semiconductor device, the synchronous control method comprising:

providing an operation verify command to the first semiconductor device from an external device;

transferring the operation verify command to the second semiconductor device from the first semiconductor device;

transferring a first trigger signal to the first semiconductor device from the second semiconductor device based on the operation verify command transferred from the first semiconductor device; and causing the first semiconductor device to receive the first trigger signal, wherein the first semiconductor device and the second semiconductor device resume operation by writing a memory setting value to a specified memory specified by the operation verifying command in the first semiconductor device and the second semiconductor device in response to transferring and receiving of the first trigger signal, based on the memory setting value.

11. The synchronous control method according to claim 10, wherein the memory setting value is a pseudo error value detected by the user program.

12. The synchronous control method according to claim 10, wherein the first semiconductor device includes a first timer for measuring an execution time of a program executed by an arithmetic unit included in the first semiconductor device, wherein the second semiconductor device includes a second timer for measuring an execution time of a program executed by an arithmetic unit included in the second semiconductor device, and wherein the memory setting value includes a stop position set value for specifying a stop position of the user program, and a first function valid set value for invalidating a timeout error detecting function for stopping a timeout error function for outputting an error when an execution time of the user program exceeds a preset execution permitted time.

13. The synchronous control method according to claim 12, wherein the first semiconductor device i) outputs a second trigger signal to the second semiconductor device based on a command given from the external device after writing the memory setting value, ii) writes a second function valid setting value for enabling the timeout error detection function as the memory setting value to a memory in the first semiconductor device, iii) resets the first timer in the first semiconductor device, and iv) outputs program sequence information to the second semiconductor device informing of an execution resuming position of the user program executed by the first semiconductor device, and wherein the second semiconductor device i) receives the second trigger signal after writing the memory setting value, ii) writes the second function valid setting value for enabling the timeout error detection function as the memory setting value in the second semiconductor device in response to receiving the second trigger signal after writing the memory setting value, iii) resets the second timer in the second semiconductor device, and iv) sets a program restart position based on the program sequence information outputted from the first semiconductor device.

14. An abnormality detection device for detecting an abnormality in a subject, the abnormality detection device comprising:

a first semiconductor device having a first memory; and
a second semiconductor device having a second memory,
wherein the first semiconductor device transmits a command inputted from outside the abnormality detection device to the second semiconductor device, wherein the second semiconductor device outputs a first trigger signal to the first semiconductor device based on information included in the command, wherein the first semiconductor device operates the first memory when the first trigger signal is received from the second semiconductor device, and wherein the second semiconductor device operates the second memory at a same time as when the first semiconductor device operates the first memory.

15. The abnormality detecting device according to claim 14, wherein the command input to the first semiconductor device is input from an external debugger, wherein the first semiconductor device and the second semiconductor device detect failure information from information in the first memory and the second memory and transfer to a safe state, and wherein the first semiconductor device outputs, to the external debugger information that the first semiconductor device has transferred to the safe state.

16. The abnormality detecting device according to claim 14, wherein the first semiconductor device includes a first operation verifying program to be executed in the first semiconductor device, wherein the second semiconductor device includes a second operation verifying program to be executed in the second semiconductor device, and wherein the command includes information indicating whether or not to synchronize memory operations on the first memory and the second memory with respect to the first operation verifying program and the second operation verifying program.

17. The abnormality detecting device according to claim 14, wherein the first semiconductor device includes a first operation verifying program to be executed in the first semiconductor device, wherein the second semiconductor device includes a second operation verifying program to be executed in the second semiconductor device, and wherein the second semiconductor device performs a memory operation on the second memory specifying a stop position for stopping the second operation verifying program based on information of the command, wherein the second operation verifying program stops when the specified stop position of the second operation verifying program is reached, and wherein the second operation verifying program resumes when a second trigger signal outputted by the first semiconductor device is inputted.

18. The abnormality detecting device according to claim 17, wherein the second semiconductor device performs a memory operation for enabling a timeout error suppression process in accordance with setting the stop position of the second operation verifying program, and wherein, when the second trigger signal is inputted from the first semiconductor device, the timeout error suppression process is disabled.

19. The abnormality detecting device according to claim 17, wherein the first semiconductor device has a first timer and the second semiconductor device has a second timer, wherein the first semiconductor device resets the first timer in response to outputting the second trigger signal, and wherein the second semiconductor device resets the second timer when the second trigger signal is inputted from the first semiconductor device.

\* \* \* \* \*